(12) United States Patent
Gover

(10) Patent No.: US 8,850,215 B2
(45) Date of Patent: Sep. 30, 2014

(54) METHOD OF ACCESS CONTROL AND CORRESPONDING DEVICE

(75) Inventor: Tim Gover, Cambridge (GB)

(73) Assignee: Nokia Corporation, Espoo (FI)

(*) Notice: Subject to any disclaimer, the term of this patent is extended or adjusted under 35 U.S.C. 154(b) by 359 days.

(21) Appl. No.: 12/809,658

(22) PCT Filed: Dec. 16, 2008

(86) PCT No.: PCT/GB2008/004139
§ 371 (c)(1),
(2), (4) Date: Nov. 12, 2010

(87) PCT Pub. No.: WO2009/081100
PCT Pub. Date: Jul. 2, 2009

(65) Prior Publication Data
US 2011/0047387 A1   Feb. 24, 2011

(30) Foreign Application Priority Data
Dec. 21, 2007  (GB) .................................. 0725071.5

(51) Int. Cl.
G06F 21/00  (2013.01)
G06F 21/60  (2013.01)
G06F 21/62  (2013.01)

(52) U.S. Cl.
CPC .......... *G06F 21/602* (2013.01); *G06F 21/6281* (2013.01)
USPC ....................................................... 713/182

(58) Field of Classification Search
USPC .................. 380/277; 713/182–186; 726/2–21
See application file for complete search history.

(56) References Cited

U.S. PATENT DOCUMENTS

| | | | |
|---|---|---|---|
| 5,495,533 A | | 2/1996 | Linehan et al. |
| 5,745,572 A | * | 4/1998 | Press .............................. 380/280 |
| 5,778,072 A | * | 7/1998 | Samar ............................. 380/30 |
| 6,609,199 B1 | | 8/2003 | DeTreville |
| 6,839,437 B1 | * | 1/2005 | Crane et al. ................... 380/286 |
| 7,802,111 B1 | * | 9/2010 | Tahan ........................... 713/193 |
| 2002/0071564 A1 | | 6/2002 | Kurn et al. |
| 2005/0120125 A1 | * | 6/2005 | Morten et al. ................. 709/231 |
| 2005/0256878 A1 | * | 11/2005 | Brown et al. .................. 707/10 |

(Continued)

FOREIGN PATENT DOCUMENTS

| EP | 1678618 A | 11/2005 |
|---|---|---|
| EP | 1788505 A1 | 5/2007 |

OTHER PUBLICATIONS

Cilardo A. et al., "An FPGA-based Key-Store for Improving the Dependability of Security Services", Proceedings of the 10th IEEE International Workshop on Object-Oriented Real-Time Dependable Systems (WORDS '05), Sedona, AZ, USA, Feb. 2-4, 2005, Piscataway, NJ, USA, IEEE, Feb. 2, 2005, pp. 389-396, XP010856911, ISBN: 978-0-7695-2347-7.*

(Continued)

*Primary Examiner* — Jeffrey Pwu
*Assistant Examiner* — Carlos Amorin
(74) *Attorney, Agent, or Firm* — Harrington & Smith (57) ABSTRACT

A computing device which includes an access control mechanism which is used to control access to keys which are used in cryptographic processes. Any application wishing to gain access to a key must first obtain authorization from the access control mechanism. Authorized applications may access keys directly, without having to pass data through the access control mechanism.

20 Claims, 6 Drawing Sheets

(56) References Cited

U.S. PATENT DOCUMENTS

| | | | |
|---|---|---|---|
| 2005/0262207 A1* | 11/2005 | Glickman et al. | 709/206 |
| 2006/0136717 A1* | 6/2006 | Buer et al. | 713/155 |
| 2008/0123855 A1* | 5/2008 | Thomas | 380/277 |
| 2008/0273706 A1* | 11/2008 | Noll | 380/279 |
| 2009/0052665 A1* | 2/2009 | Goodman et al. | 380/44 |
| 2009/0092252 A1* | 4/2009 | Noll et al. | 380/277 |
| 2009/0138708 A1* | 5/2009 | Miyazaki et al. | 713/168 |
| 2012/0185694 A1* | 7/2012 | Munetoh et al. | 713/168 |
| 2013/0010962 A1* | 1/2013 | Buer et al. | 380/270 |

OTHER PUBLICATIONS

Cilardo et al., "An FPGA-based Key-Store for Improving the Dependability of Security Services", 2005, Proceedings of the 10$^{th}$ IEEE International Workshop on Object-Oriented Real-Time Dependable Systems (WORDS '05).*

Chin-Ling Chen, "A Secure and Traceable E-DRM System Based on Mobile Device", ScienceDirect Expert Systems with Applications, Oxford, GB, vol. 35, No. 3, Jul. 2007, pp. 878-886.

Michael Brown et al., "PGP in Constrained Wireless Devices", Proceedings of the Usenix Security Symposium, XX, Aug. 14, 2000, 15 pages.

Alessandro Cilardo et al., "An FPGA-Based Key-Store for Improving the Dependability of Security Services," Proceedings of the 10th IEEE International Workshop on Object-Oriented Real-Time Dependable Systems (WORDS'05), Sedona, AZ, USA, Feb. 2005, 8 pages.

Jonathan Dixon, "Symbian OS v9 Security Architecture," Internet Citation, White Paper, Symbian LTD 2005, 18 pages.

International Search Report mailed on Mar. 26, 2009, for corresponding PCT Application No. PCT/GB2008/004139, 16 pages.

UK Intellectual Property Office Search Report under Section 17(5) mailed on Apr. 7, 2008, for corresponding Great Britain patent application No. 0725071.5 filed Dec. 21, 2007, 6 pages.

Andrew S Tanenbaum, "Moderne Betriebssysteme" 2003, Pearson, XP002521130, ISNB: 3-8273-7019-1, p. 690.

"Federal Information Processing Standards Publications (FIPS PUBS)", The FIPS Home Page, http:/www.itl.nist.gov/fipspubs/; Jun. 15, 2012, 1 pg.

"PKCS #11: Cryptographic Token Interface Standard", RSA Laboratories, http://www.rsa.com/rsalabs/node.asp?id=2133; Jun. 15, 2012, 4 pgs.

"Crypto++® Library 5.6.1", http://www.cryptopp.com/; Jun. 15, 2012, 6 pgs.

* cited by examiner

METHOD OF ACCESS CONTROL AND CORRESPONDING DEVICE

CROSS-REFERENCE TO RELATED APPLICATIONS

This application was originally filed as PCT Application No. PCT/GB2008/004139 filed Dec. 16, 2008, which claims priority to Great Britain Application No. 0725071.5 filed Dec. 21, 2007.

BACKGROUND OF THE INVENTION (1) Field of the Invention

The present invention relates to a device including a key store and a mechanism for controlling access to the key store. The present invention also relates to a method for controlling access to a key store.

(2) Description of Related Art

Cryptography is used in a number of different software applications in order to prevent unauthorised third parties gaining access to sensitive or private material. For example, if an email message contains sensitive information, the sender can encrypt the email using an encryption key. Only the authorised recipient, with the correct decryption key, is able to decrypt and view the contents of the email.

Another use of encryption keys is in the field of digital rights management (DRM). Audio files may be encrypted by the vendor of the music so that only those with the correct key can play the music. Typically, anyone purchasing the music legally will be provided with the key necessary for decrypting the audio file.

The keys which are used in cryptographic techniques must be stored safely. In addition, decryption processes can be computationally complex and therefore demand a lot of system processor time. It is therefore known to provide cryptographic acceleration processors, or more generally, cryptographic hardware. Such hardware is used to provide a secure storage area for keys which is separate from the rest of a computer's hardware. In addition, because a processor is dedicated to cryptographic processes, less demand is made of the other resources of the computing device.

In order for any cryptographic system to be secure, access to the keys, and the cryptographic hardware in general, must be controlled. One system which is known from the prior art is shown in FIG. 1.

Figure 1:
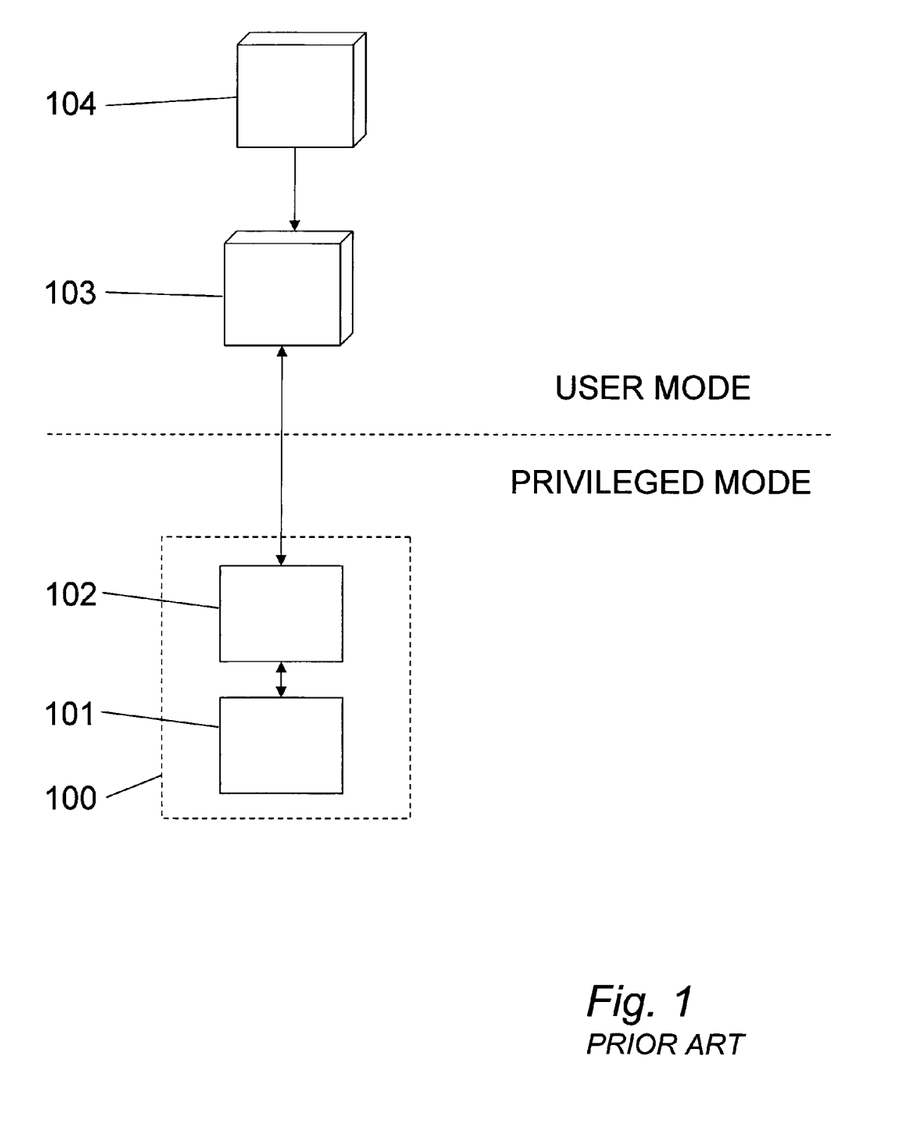
FIG. 1 shows a cryptographic access system known from the prior art.

FIG. 1 shows a cryptographic device driver 100, which includes a physical device driver (PDD) 101 and a logical device driver (LDD) 102. The cryptographic device driver is typically part of the operating system kernel. The operating system kernel is restricted from access by certain user side applications and is said to run in privileged mode. The cryptographic device driver 100 is the interface between the cryptographic acceleration processor (not shown) and higher level software. The PDD/LDD arrangement will be familiar to those skilled in the art. In the present case, the LDD 102 provides the actual interface to higher layers of the OS.

Also shown in FIG. 1 is a dedicated cryptography server 103. This server sits above the kernel in user space and is said to run in user mode. Only the dedicated cryptography server 103 is allowed to talk to the LDD 102. The LDD 102 will not allow any other executable or process to access it. Therefore, any attempt by malicious code to directly access the LDD 102 will fail. Any legitimate application (e.g. application 104) wishing to gain access to a key must do so via the dedicated cryptography server 103. The dedicated cryptography server 103 is therefore responsible for access control. The access control may be achieved using, for example, capabilities, as discussed further below. In order for data to be, for example, decrypted, it must be copied from the application 104 to the dedicated cryptography server 103. Once the data is copied, the dedicated cryptography server 103 is responsible for carrying out the cryptographic operation. Once the result of the operation is determined, the data is copied back to the application 104.

As can be seen, the security policies for the cryptographic system are controlled by the dedicated cryptographic server 103. The main problem with this mechanism is that any data which is to be subjected to cryptographic processing must be copied to and from the dedicated cryptography server 103. This can be a resource-intensive procedure.

Figure 2:
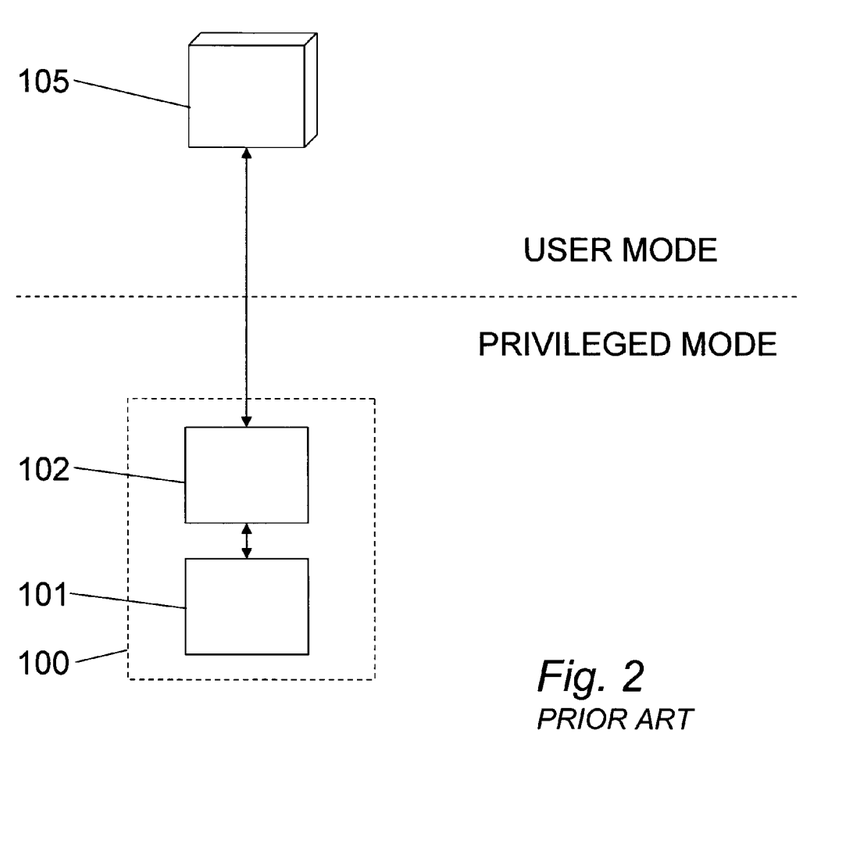
FIG. 2 shows a further cryptographic access system known from the prior art.

Another system known from the prior art is shown in FIG. 2. Here, the cryptographic device driver 100 includes the same PDD 102 and LDD 102 as shown in FIG. 1. In this system, an application 105 communicates directly with the LDD 102. The cryptographic device driver controls the security policies of the cryptographic system.

The main problem with such a system is that there is generally not enough memory space in the cryptographic hardware for security policies to be stored. Therefore, it is impossible for complex security policies to be implemented with such a system. Also, because the security policies are stored in the cryptographic hardware, modification and expansion of the security policy is more difficult than would be the case with a user space based system, such as the dedicated cryptographic server described above.

Another mechanism for implementing a cryptographic security model is to limit the cryptographic operations to specific processes, such as the media player. Such techniques tend to be used with closed devices where third parties cannot develop and install their own software. Such systems are not flexible at all and the cryptographic operations cannot be extended to other applications.

There is therefore a need for an improved system for managing cryptographic security policies.

SUMMARY OF THE INVENTION

The present invention provides a computing device having at least one key stored thereon; wherein control of access to said key is delegated to an access mechanism, stored on the device; and said device is arranged such that said at least one key may be accessed directly if access has been authorised by said access mechanism.

In another aspect, the present invention provides a computing device comprising at least one application, a key store having at least one key, and an access control mechanism, wherein the at least one application is arranged to send requests for key store access to said access control mechanism and to communicate directly with said key store to access said at least one key, the access control mechanism is arranged to receive requests for access to said key store from said at least one application, to determine whether said application is permitted to access said key store and to pass information concerning said at least one application to said key store if said at least one application is authorised to access said key store, and said key store is arranged to receive said information concerning said at least one application from said access control mechanism and to allow access by said at least one application, to said at least one key, if the key store has received information concerning said at least one key from said access control mechanism.

In another aspect, the present invention provides a method of controlling access to at least one key stored on a computing device, the device comprising an access mechanism, the method comprising using the access mechanism to authorise access to said at least one key; and following authorisation, enabling direct access to said key.

In another aspect, the present invention provides a non-transitory computer readable medium storing a computer program configured to control access to at least one key stored in a cryptographic unit on a device. The device comprising an access control mechanism, wherein the computer program is configured to: use the access control mechanism to authorise access to the at least one key; and following authorisation, enable direct access to the at least one key, wherein the access control mechanism is operable in user mode.

Other features of the present invention are defined in the appended claims. Features and advantages associated with the present invention will be apparent from the following description of the preferred embodiments.

BRIEF DESCRIPTION OF THE DRAWINGS

The invention will now be described in more detail with reference to the accompanying drawings in which.

DETAILED DESCRIPTION OF THE INVENTION

Figure 3:
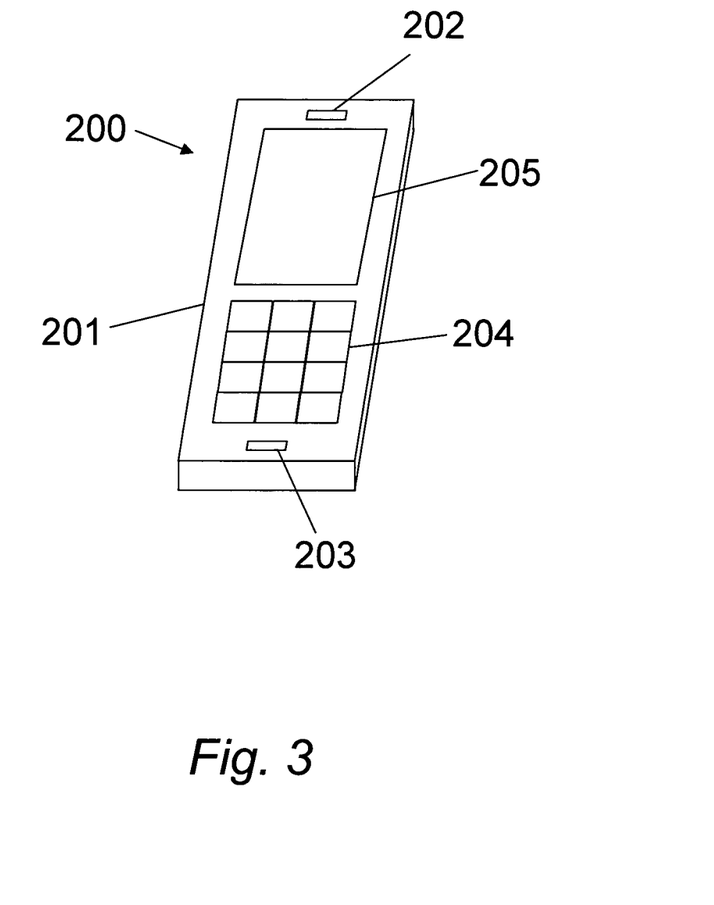
FIG. 3 shows a mobile device in accordance with an embodiment of the invention.

FIG. 3 shows an example of a device on which the present invention could be implemented. A mobile device 200 comprises an outer casing 201, which includes an earphone 202 and a microphone 203. The mobile device 200 also includes a keypad 204 and a display 205. The keypad 204 enables a user to enter information into the mobile device 200 and instruct the mobile device to perform the various functions which it provides. For example, a user may enter a telephone number, or select another mobile device from a list stored on the mobile device 200, as well as perform functions such as initiating a telephone call.

Figure 4:
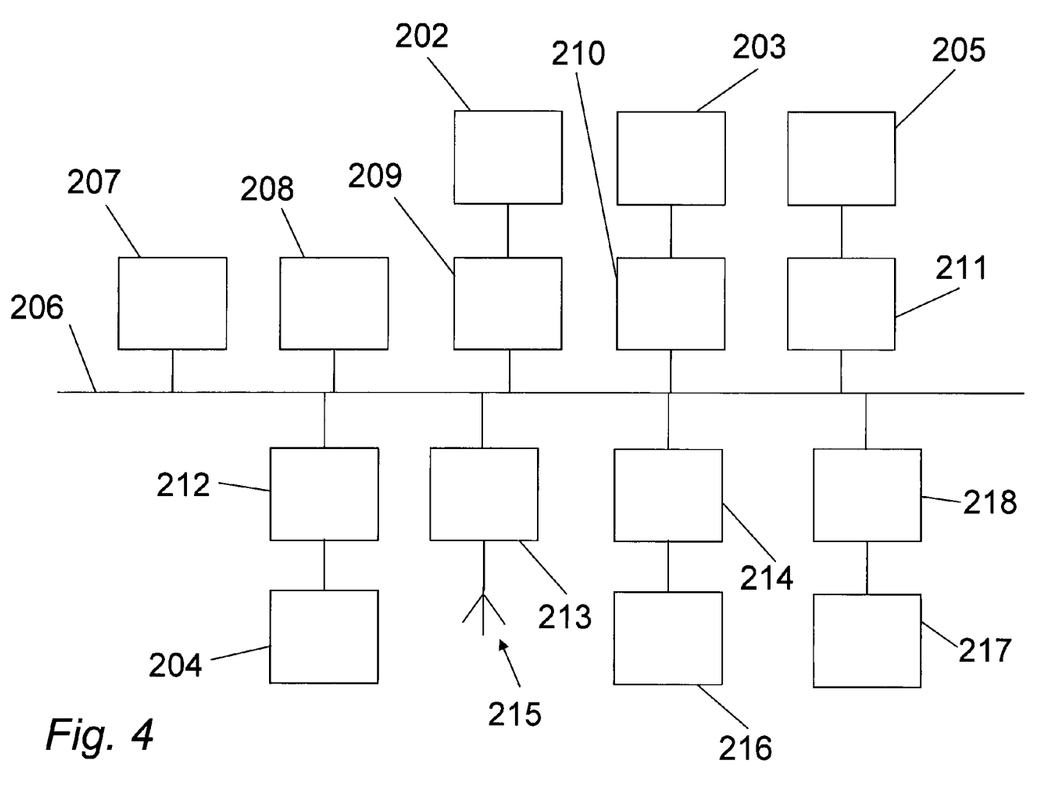
FIG. 4 is a schematic diagram showing the components of the mobile device of FIG. 3.

FIG. 4 is a schematic diagram showing the components of the mobile device 200. The device includes a system bus 206 to which the components are connected and which allows the components to communicate with each other. Here, the components are shown to communicate via a single system bus 206, however in practice the mobile device may include several buses to connect the various components. The components of the mobile device 200 include a processor unit 207, memory 208, an earphone controller 209, a microphone controller 210, a display controller 211, a keyboard controller 212, a transceiver 213 and a storage device controller 214. FIG. 4 shows a single processor unit 207, however in practice the device may include two or more processor units to control different components of the device. In particular, the device 200 may include a baseband processor unit to control a telephony stack, and an application processor to control an operating system and a user interface of the device. The transceiver 213 is also connected to an antenna 215. The mobile device 200 is arranged to communicate, using transceiver 213, with a base station of a mobile phone network (not shown). The storage device controller 214 is connected to a storage device 216 which may be an internal hard drive or a removable storage device such as a flash memory card.

The mobile device 200 also includes a cryptographic unit 217. The cryptographic unit 217 includes memory (not shown) and a cryptographic acceleration processor (not shown). The cryptographic unit 217 is connected to the system bus 206 by cryptographic unit controller 218. The method of operation of the cryptographic unit 217 will be described below.

Figure 5:
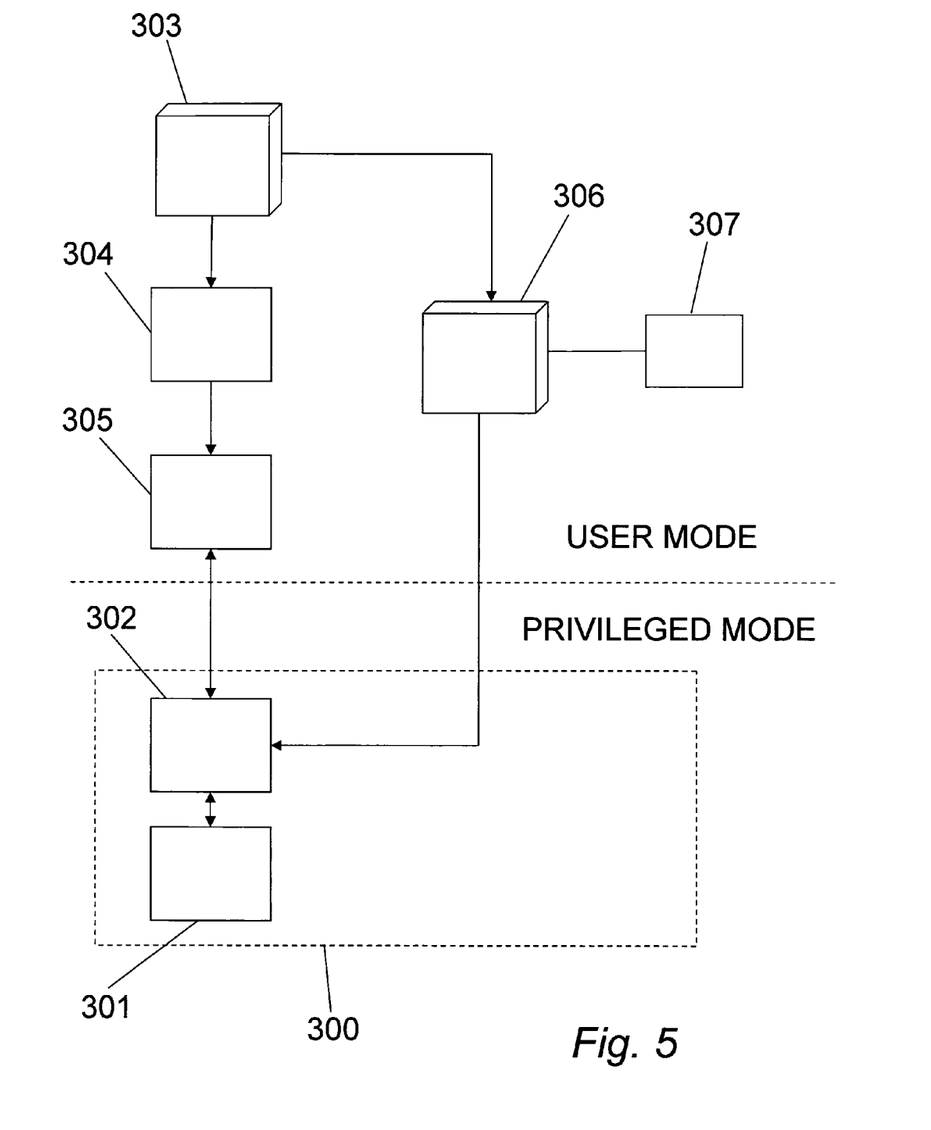
FIG. 5 is a cryptographic access system in accordance with an embodiment of the present invention.

Referring to FIG. 5, a cryptographic device driver 300 is shown which includes a physical device driver (PDD) 301 and a logical device driver (LDD) 302. The PDD/LDD pair are part of the operating system kernel and therefore operate in privileged mode. The cryptographic device driver 300 provides the interface between the cryptographic unit 217 and higher levels of the operating system. Also shown is an application 303 which is arranged to carry our cryptographic operations. Various information is associated with the application 303 which is unique to the application. For example, the application has a secure ID and may have a number of capabilities. The secure ID is unique to each application and enables the operating system to identify the application. As discussed below, capabilities are the access rights which a particular application has. They allow the operating system to determine what system resources a particular application is allowed to access. When carrying out such an operation, the application loads a dynamic linked library (DLL) known as a cryptographic SPI (system program interface). In use, the cryptographic SPI DLL 304 is loaded into application 303 and runs as an application process. When an application requires use of a key stored in the cryptographic unit 217, the cryptographic SPI DLL 304 loads hardware plug-in DLL 305. As with the cryptographic SPI DLL 304, in use, the hardware plug-in DLL 305 is loaded into the application 303 and is run as an application process.

Capabilities allow an operating system to carefully control which resources can be accessed by which executables and by which static or dynamic linked libraries. Executables may be assigned a set of capabilities which specify which resources the executable is allowed to access and what actions that executable is allowed to carry out. In an operating system which uses servers to control access to particular resources, the servers determine whether an executable is allowed access to a particular resource, based on its capabilities.

The hardware plug-in DLL 305 enables the application 303 to communicate directly with the LDD 302. However, this does not necessarily mean that the application 303 will be granted access to the cryptographic unit 217, as will be described below. The cryptographic system shown in FIG. 5 also includes a key management server (KMS) 306. The KMS 306 is arranged to control access by applications to the cryptographic unit 207. The KMS 306 is directly accessible by application 303. The KMS 306 is also able to communicate with the LDD 302. Also shown is a key management database (KMD) 307. The KMD 307 includes information regarding which applications are allowed to access which keys.

The application 303 has capabilities associated with it as noted above. In the present case, the application 303 may have a capability which indicates that the application is allowed to access a particular key. The KMS 306 checks the application's capabilities and will allow access to the key, as described below, if the application has the correct capability.

The operation of the cryptographic system will now be described in more detail.

Figure 6:
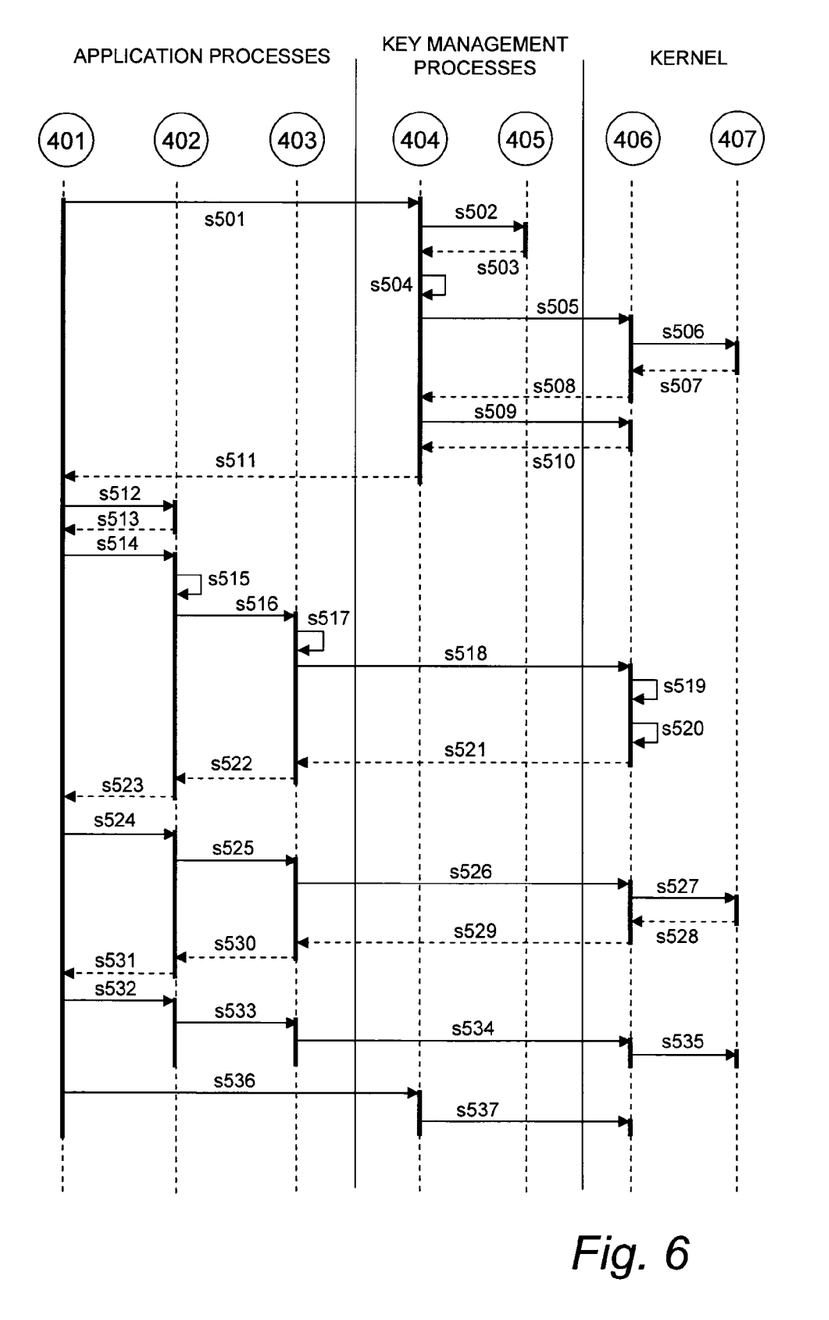
FIG. 6 is an interaction diagram showing process interactions in an embodiment of the present invention.

FIG. 6 is an interaction diagram which shows the interactions between application processes, key management processes and kernel processes. The application processes include application 303 processes 401, cryptographic SPI DLL 304 processes 402 and hardware plug-in DLL 305 processes 403. As noted above, the cryptographic SPI DLL 304 and the hardware plug-in DLL 305 are both DLLs which are loaded by the application 303. All of these executables are therefore run as part of the application processes. The key management processes include KMS 306 processes 404 and KMD 307 processes 405. Finally, the kernel includes the cryptographic device driver processes. These are LDD 302 processes 406 and PDD 301 processes 407.

The process of carrying out a key operation begins with application 303 determining the identity of the key which it requires. The application 303 sends a request for access to the specified key to the KMS 306 (s501). The request includes the secure ID and the capabilities for the application 303. The KMS 306 then checks the KMD 307 (s502) in order to determine whether or not the application 303 is allowed access to the specified key. The KMD 307 contains meta-data which includes information defining key usage and key ownership information. The KMD 307 then returns the relevant meta-data to the KMS 306 (s503). The KMS 306 uses the secure ID and capabilities of the application 303 to determine whether or not the application 303 is allowed access (s504).

One of the main benefits of this arrangement is that the security policies implemented by the KMS 306 can be as extensive and as complex as the device manufacturer desires. There is no limit on the size of the KMD 307 or on the size of the KMS 306 because they both reside in user space. This is in contrast to the prior art shown in FIG. 2. Here, because the security policies are implemented in the cryptographic device driver 100, there is a clear limit on the amount of memory which can be assigned to security policy code and meta-data.

Assuming the application 303 is allowed access to the specified key, the KMS 306 sends a request to the LDD 302 (s505) to open a handle to the specified key. The KMS 306 also has a secure ID. The LDD 302 knows the secure ID of the KMS 306 and always allows the KMS 306 access. The LDD 302 checks with the PDD 301 to ensure that the requested key exists in the cryptographic unit (s506). In turn, the PDD checks the hardware key store to ensure that the key exists. Assuming the specified key does exist, the PDD 301 informs the LDD 30 that this is the case (s507). The LDD 302 then passes the specified key handle back to the KMS 306 (s508). The KMS 306 sends the secure ID of the application 303 to the LDD 302 together with details of the specified key to which the application 303 should be allowed access (s509). The KMS 306 also informs the LDD 302 of the operations which the application is allowed to perform with the specified key. For example, if the application 303 has requested the key for the purposes of decryption, the application will not be allowed to use the key for other cryptographic purposes. The LDD 302 the sends a confirmation that the secure ID of application 303 has been registered (s510). The KMS 306 stores the specified key handle in a key information object and passes a handle to that object back to the application 303 (s511). This is the last part of the process in which the KMS 306 takes part. All future process interactions are between application processes and kernel processes.

In order for the application to carry out the necessary key process, it must first load the cryptographic SPI DLL 304. Once loaded, the cryptographic SPI DLL 304 brings together the necessary elements for the key process to be carried out. The cryptographic SPI DLL 304 includes a generic key factory. The generic key factory is arranged to load the necessary cryptographic algorithm and produce a generic key object. The data from the application and the key from the cryptographic unit are ultimately loaded into the generic object so that the key process can be carried out. Once the cryptographic SPI DLL 304 is loaded, the application 303 calls the cryptographic SPI DLL 304 (s512). The application indicates that the key is a non-extractable key located in the cryptographic unit 217 and passes the identity of the specified key together with the identity of the required algorithm. The cryptographic SPI DLL then returns the generic key object to the application 303 (s513). The application 303 then sends a request to the cryptographic SPI DLL 304 (s514) which then looks-up the necessary plug-in for the specified key and algorithm (s515). The cryptographic SPI DLL 304 then loads the hardware plug-in DLL 305 (s516). The hardware plug-in DLL 305 checks to see if it recognises the specified key handle (s517). The hardware plug-in DLL 305 then attempts to open a handle to the LDD 302 (s518). The LDD 302 checks the secure ID of the caller against the secure IDs which have been registered for the specified key (s519). In the present case, the secure IDs match and the LDD creates a key handle (s520). The key handle is passed back to the hardware plug-in DLL 305 (s521), which passes the key handle to the cryptographic SPI DLL 304 (s522) which passes the key handle to the application 303 (s523).

Once the application 303 has the key handle, it can obtain the key from the LDD 302. The application 303 sends an instruction to the LDD 302 (s526) to create a key object via the cryptographic SPI DLL 304 (s524) and the hardware plug-in DLL 305 (s525). The LDD 302 then obtains the specified key from the PDD 301 (s527+s528) and returns the key in a key object to the hardware plug-in DLL 305 (s529). The hardware plug-in DLL 305 passes the key object to the cryptographic SPI DLL 304 (s530) which passes the key object to the application 303 (s531). The application can then carry out the necessary key process using the specified key.

Once the cryptographic operation is complete, the application 303 closes the cryptographic SPI DLL 304 (s532) which in turn closes the hardware plug-in DLL 305 (s533). The handle to the key is also closed (s534+s535) The application the informs the KMS 306 that it has finished with the specified key (s536+s537). The KMS 306 then informs the LDD 302 that the application has finished with the key and the secure ID for the application 303 is unregistered by the LDD 302.

As a result of the above described processes, data which is used in the cryptographic process can be loaded into memory, by said application 303, and modified in the application memory space. The data does not need to be copied to another memory space in order for the cryptographic operation to be carried out. This is in contrast to the prior art shown in FIG. 1. Here, all data which is to be subjected to cryptographic processing must be copied to the dedicated cryptographic server. This increases the burden on device resources and slows the whole process down. The above described embodiment does not suffer from the disadvantages of data copying which the prior art suffers from.

In the above embodiment, the client application is always trying to use a key stored in the key store. If an application provides its own key, it is of course possible for such an application to perform any operation it requires with that key.

It will be appreciated by the skilled reader that the above embodiment uses two access lists. One access list is a persistent access list which is kept by the KMD 307. The other list is the non-persistent temporary list kept by the LDD 302. The LDD only needs to store information relating to the keys which are currently in use. This information can be stored in kernel side device memory together with other normal data.

The persistent access list is kept in user space by the KMS 306. This file may be encrypted and be protected by a specific hardware key known to the KMS 306.

In the above description the cryptographic mechanism has been described as allowing direct access to the key store. In the context of the present application, "directly" is intended to mean that, once authorisation is confirmed, applications may access the key store without involving the key management server. The term "directly" should not be taken to mean that the application is not required to communicate with the key store through other layers of code. For example, the application may be required to access the key store via layers of the operating system which include the device drivers. This is "direct" access in the context of the present invention.

In the above description, various processes including decryption and signing have been described. The term cryptographic encompasses these processes as well as any other processes which require the use of keys or similar devices which are used in processes of this nature.

The above described embodiment relates to keys which are stored in dedicated cryptographic hardware. The present invention may also be implemented using keys which are protected by a software based key store. For example, the keys may be stored in the device main memory and be protected by an operating system based key store. The access control mechanism of the present invention may also be applied to such an environment.

The term "client" is intended to refer to any executable, library or other entity which may require access to a particular key. It is not intended to be limited to particular types of entities such as user applications. It is intended to include any entity that requires services of another entity.

Various modifications, changes, and/or alterations may be made to the above described embodiments to provide further embodiments which use the underlying inventive concept, falling within the spirit and/or scope of the invention. Any such further embodiments are intended to be encompassed by the appended claims.

The invention claimed is:

1. A device comprising:
   a cryptographic unit;
   at least one key stored in a memory of said cryptographic unit; and
   an access control mechanism operating on a user side of the device, wherein control of access to said at least one key is delegated to the access control mechanism, the device being configured to allow direct access to said at least one key if access has been authorised by said access control mechanism,
   wherein the access control mechanism is operating in user mode, and
   wherein data used in a cryptographic process can be loaded into an application memory space by an application and modified in said application memory space without needing to be copied to another memory space in order for a cryptographic operation to be carried out.

2. The device according to claim 1, further comprising at least one client, arranged for use with said at least one key, wherein said at least one client is arranged to access said at least one key directly, if access is authorised by said access control mechanism.

3. The device according to claim 2, wherein said at least one key is arranged for use in at least one cryptographic process and said device is arranged such that when access has been authorised by said access control mechanism, access to said at least one key, for use in said at least one cryptographic process, is not through said access control mechanism.

4. The device according to claim 3, further comprising data, for use with said at least one key in said at least one cryptographic process; wherein said device is arranged such that, during operation of said at least one cryptographic process, said data is not copied to said access control mechanism.

5. The device according to claim 4, wherein said at least one client is at least one application, and wherein said at least one application is arranged to load said data into a memory space of said device and further arranged such that said data is modified by said at least one cryptographic process in said memory space.

6. The device according to claim 5, further comprising a key store in which said at least one key is stored, wherein said access control mechanism is arranged to inform said key store that said at least one application is authorised to access said at least one key.

7. The device according to claim 6, wherein said access control mechanism operates independently of said key store.

8. The device according to claim 6, further comprising a cryptographic hardware unit which includes said key store and a cryptographic acceleration processor.

9. The device according to claim 8, further comprising a cryptographic device driver, said cryptographic device driver arranged to provide an interface between the cryptographic hardware unit and said at least one application and said access control mechanism.

10. The device according to claim 1, wherein said at least one key is stored on a kernel side of the device.

11. The device according to claim 1, further comprising:
    at least one application; and
    a key store storing said at least one key,
    wherein the at least one application is configured to:
      send requests for key store access to said access control mechanism, and to communicate directly with said key store to access said at least one key;
    said access control mechanism being configured to:
      receive requests for access to said key store from said at least one application;
      determine whether said at least one application is permitted to access said key store; and
      pass information concerning said at least one application to said key store if said at least one application is authorised to access said key store;
    said key store being configured to:
      receive said information concerning said at least one application from said access control mechanism; and
      allow access by said at least one application, to said at least one key, if the key store has received information concerning said at least one application from said access control mechanism.

12. A method of controlling access to at least one key stored in a memory of a cryptographic unit on a device, the device comprising an access control mechanism, the method comprising:
    using the access control mechanism to authorise access to said at least one key stored in the memory of said cryptographic unit; and following authorisation, enabling direct access to said at least one key, wherein the access control mechanism is operating in user mode, and
    wherein data used in a cryptographic process can be loaded into an application memory space by an application and modified in said application memory space without needing to be copied to another memory space in order for a cryptographic operation to be carried out.

13. The method according to claim 12, wherein said device further comprises at least one client, and said enabling direct access comprises enabling said at least one client to directly access said at least one key.

14. The method according to claim 13, wherein said direct access is carried out independently of said access control mechanism.

15. The method according to claim 14, wherein said device further comprises data, for use with said at least one key; wherein said method does not include copying said data to said access control mechanism.

16. The method according to claim 15, further comprising using said data and said at least one key in a cryptographic process.

17. The method according to claim 16, wherein said at least one client is at least one application, the method further comprising using said at least one application to load said data into said application memory space of said device, wherein using said data in said cryptographic process comprises modifying said data in said application memory space.

18. The method according to claim 12, further comprising informing said access control mechanism that access to said at least one key is required, and accessing said at least one key directly.

19. The method according to claim 18, wherein said device further comprises a key store in which said at least one key is stored and the method further comprises informing said key store that access to said at least one key is authorised.

20. A non-transitory computer readable medium storing a computer program configured to control access to at least one key stored in a cryptographic unit on a device, the device comprising an access control mechanism, wherein the computer program is configured to: use the access control mechanism to authorise access to said at least one key; and following authorisation, enable direct access to said at least one key, wherein the access control mechanism is operating in user mode, and wherein data used in a cryptographic process can be loaded into an application memory space by an application and modified in said application memory space without needing to be copied to another memory space in order for a cryptographic operation to be carried out.

* * * * *